United States Patent
O'Ham

(10) Patent No.: US 8,129,578 B2
(45) Date of Patent: Mar. 6, 2012

(54) METHOD FOR SEPARATION OF CONSTITUENTS FROM MATRICES

(75) Inventor: Jeffrey K. O'Ham, Charlotte, NC (US)

(73) Assignee: IR Systems International, Huntersville, NC (US)

( * ) Notice: Subject to any disclaimer, the term of this patent is extended or adjusted under 35 U.S.C. 154(b) by 0 days.

(21) Appl. No.: 12/805,535

(22) Filed: Aug. 4, 2010

(65) Prior Publication Data

US 2011/0065566 A1    Mar. 17, 2011

Related U.S. Application Data

(63) Continuation of application No. 11/806,994, filed on Jun. 5, 2007, now Pat. No. 7,790,944, which is a continuation of application No. 09/191,702, filed on Nov. 13, 1998, now Pat. No. 7,244,401.

(51) Int. Cl.
*A62D 3/40* (2007.01)

(52) U.S. Cl. .......................................... 588/321; 588/405

(58) Field of Classification Search .................. 588/16, 588/17, 321, 405, 410, 305, 309
See application file for complete search history.

(56) References Cited

U.S. PATENT DOCUMENTS

| | | | |
|---|---|---|---|
| 682,118 A | 9/1901 | Sewell et al. |
| 1,869,844 A | 8/1932 | Derr |
| 3,706,662 A | 12/1972 | Wellford |
| 4,087,276 A | 5/1978 | Generini |
| 4,195,744 A | 4/1980 | Christianson |
| 4,284,000 A | 8/1981 | Almeda, Jr. |
| 4,631,384 A | 12/1986 | Cornu |
| 4,718,358 A | 1/1988 | Nomi |
| 4,780,287 A | 10/1988 | Zeff et al. |
| 4,782,625 A | 11/1988 | Gerken et al. |
| 4,822,651 A | 4/1989 | Newsom |
| 4,924,785 A | 5/1990 | Schultz et al. |
| 4,951,583 A | 8/1990 | McGill |
| 4,978,616 A | 12/1990 | Dean et al. |
| 5,025,570 A | 6/1991 | Moffat |
| 5,072,674 A | 12/1991 | Noland et al. |
| 5,126,042 A | 6/1992 | Malone |
| 5,127,343 A | 7/1992 | O'Ham |
| 5,209,774 A | 5/1993 | Rockandel et al. |
| 5,249,368 A | 10/1993 | Bertino et al. |
| 5,300,137 A | 4/1994 | Weyand |
| 5,314,527 A | 5/1994 | Rockandel et al. |
| 5,325,795 A | 7/1994 | Nelson et al. |
| 5,342,449 A | 8/1994 | Holbein et al. |
| 5,389,248 A | 2/1995 | Pare et al. |
| 5,599,137 A | 2/1997 | Stephenson et al. |
| 5,602,035 A | 2/1997 | Sonnen et al. |
| 5,635,394 A | 6/1997 | Horn |
| 5,656,494 A | 8/1997 | Kant et al. |
| 6,146,596 A | 11/2000 | Hill et al. |
| 6,462,250 B1 | 10/2002 | Kuriyama et al. |
| 7,790,944 B2 * | 9/2010 | O'Ham ....................... 588/321 |

FOREIGN PATENT DOCUMENTS

| | | |
|---|---|---|
| DE | 3824014 | 1/1990 |
| DE | 4229428 | 3/1994 |
| DE | 19608002 | 11/1997 |
| EP | 0 437 666 | 7/1991 |
| EP | 0 629 818 | 12/1994 |
| EP | 695214 | 10/1997 |
| EP | 0 899 509 | 3/1999 |
| WO | WO99/03600 | 1/1999 |

* cited by examiner

*Primary Examiner* — Edward Johnson
(74) *Attorney, Agent, or Firm* — Jones Day

(57) ABSTRACT

The present invention provides an apparatus useful for the separation of hazardous and non-hazardous organic and inorganic constituents from various matrices. A method of separating such constituents is also provided.

28 Claims, 3 Drawing Sheets

MATRIX CONSTITUENT SEPARATOR

AGITATOR TRAY

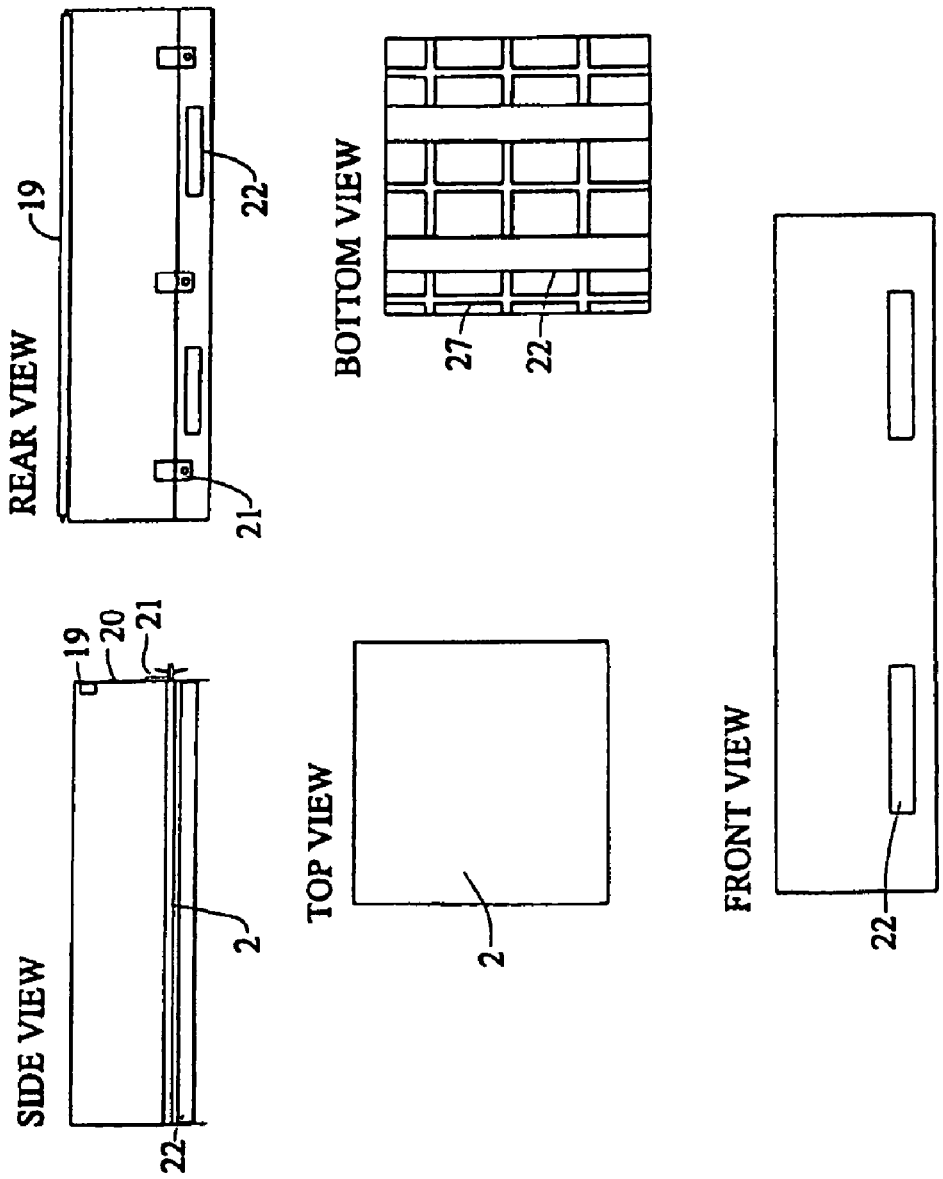

METHOD FOR SEPARATION OF CONSTITUENTS FROM MATRICES

CROSS REFERENCE TO RELATED APPLICATIONS

This application is a continuation of U.S. application Ser. No. 11/806,994, filed Jun. 5, 2007, which is a continuation of U.S. application Ser. No. 09/191,702, filed on Nov. 13, 1998 which is now U.S. Pat. No. 7,244,401. Each of these applications, in their entirety, are incorporated herein by reference.

BACKGROUND OF THE INVENTION

Since the early 1950's, the various branches of the United States Department of Defense (DOD) and the United States Department of Energy (DOE) have been aggressively developing and manufacturing nuclear weapons and energy components involving various radioactive materials. The process of refining nuclear materials and decontaminating various apparatus used in these processes and others with various types of organic and inorganic materials has generated hundreds of thousands of tons of soils, sludges, debris or other residuals contaminated with radionuclides and various hazardous and non-hazardous organic and inorganic chemical constituents. The United States Environmental Protection Agency (EPA) has defined a waste that contains radionuclides and hazardous or non-hazardous waste constituents as a mixed waste.

Historically, mixed waste was typically stored on site in containers in designed containment areas, or storage vessels or disposed of in landfill cells or trenches. The disposal of mixed waste in DOD or DOE landfills or trenches is no longer permitted. Due to the promulgation of EPA regulations, mixed waste is not permitted to be disposed of at an EPA approved hazardous waste facility or a radioactive waste facility until the constituents can be separated and segregated from each other.

This need to remediate the mixed waste at these sites is being accelerated due to the fact that the DOE and DOD are currently undergoing a major restructuring effort, whereas numerous DOE and DOD facilities throughout the country are being decommissioned and decontaminated for light industrial, commercial or residential redevelopment. A large percentage of these facilities contain soil, sludges or other residuals, which is defined by the EPA as a mixed waste. To compound the problem, the mixed waste that has been buried in trenches and landfills has had a significant impact on groundwater reserves in some locations. These areas must be remediated in accordance with EPA regulations which involves in most cases the removal and remediation of the pollution source materials (non-liquid matrices).

The present invention discloses a method that is capable of separating hazardous and non-hazardous organic and inorganic constituents from the non-liquid matrices without destabilizing or spreading the radionuclides. After separation, the radioactive waste stream is either disposed of at the DOE or DOD facility in accordance with EPA regulations, or disposed of at an EPA approved radioactive waste facility. This allows for a significant economic benefit to handle this waste stream in this manner. Currently, there are virtually no available methods to conduct the separation of this waste stream in an environmentally sound and cost effective manner.

In addition to mixed waste, the annual generation of hazardous and non-hazardous (chemically contaminated) wastes in the United States alone is estimated to be in the range of hundreds of millions of metric tons. Industries throughout the world rely on processes in manufacturing which generate waste products routinely. Many of these waste products are disposed of as hazardous waste, which is very expensive. There is a need to reclaim for reuse some of the raw materials by separating the contaminants from various matrices. This allows industry to minimize the waste that is produced, lower operating costs and comply with current regulations.

The hazards to public health and the environment, which are posed by these various chemical constituents, are well known and documented. Various methods for the destruction or decomposition of high boiling point hazardous wastes is extremely expensive. It is not very cost effective to utilize high grade energy to thermally destroy an entire hazardous waste matrices when the contaminant itself is such a small portion of the volume by weight. Also, because the non-liquid matrix which has become contaminated due to contact with the chemical compound should be reused or recycled if possible. It is more cost effective with regard to matrices contaminated with hazardous wastes such as PCBs, pesticides, herbicides, PCPs, dioxins, furans, and the like to minimize the waste stream which require expensive destruction or decomposition methods by separating the bulky non-liquid matrix which typically makes up between 75% to 90% of the waste stream volume.

Therefore, the invention provides an economical waste minimization and resource recycling method as an alternative option to the current art in response to a market need for technology to better handle industrial process waste, mixed waste and hazardous waste streams in an environmentally sound and cost effective manner. O'Ham (U.S. Pat. No. 5,127,343, the entire contents of which are herein incorporated by reference) teaches an apparatus and method for decontaminating and sanitizing soil, particularly soil containing petroleum hydrocarbons, such as gasolines, oils, and the like in a batch process where the soil is stationary during treatment. This process was specifically designed in response to the large market need for on-site treatment technology of petroleum hydrocarbon contaminated soils from gasoline service stations and other related users of petroleum products, in response to the regulatory requirements of the Underground Storage of Hazardous Substances Act and related regulations, which required petroleum hydrocarbon contaminated soils to be remediated.

The prior art has no means of controlling fugitive dust during the loading and unloading of matrices. Soil is normally transported via loader from a stockpile to the processing device. In doing so the contaminants are spread through spillage and wind born dust. Both workers and possible bystanders, or nearby public have a much higher potential exposure to contaminants as well as possible uncontrolled releases of contaminants to the environment The prior art requires 20% and greater downtime to perform maintenance of the processor. Soils are placed directly into a process unit on screens (vacuum tubes) surrounded by a filter media (pea stone). Screens become easily plugged requiring constant cleaning between batches. The entrance door is lowered to allow for a front end loader to enter the chamber and deposit the soils for treatment and raised to create a track for the carriage of heaters to roll on top of the chamber for treatment. The entrance door hinges become blocked with matrices and filter media and have to be cleaned after each batch. These doors become easily damaged from this process and become nearly impossible to seal with air by passing the soil, resulting in insufficient treatment. Furthermore, damage to the hinge results in the access door becoming out of line. When this happens, the track for the heater carriage becomes out of line and can cause the heater carriage to fall off of the track on this side of the unit resulting in increased downtime.

Prior art was unreliable in treatment. Air flows through the static bed are uneven and variable resulting in temperature gradients across the matrix to be treated. Air bypasses were caused by plugged screens and pea stone, and the inability to seal the loading door. Also, the vacuum screens were located directly under only approximately 50% of the static soil bed surface area, resulting in incomplete treatment throughout the soil or creating "cold spots". Uneven heating results in inadequate treatment.

The prior art uses expensive filter media which adds to the waste stockpile and cost to operate.

The prior art requires extensive cleaning between jobs. Often decontamination procedures are unsuccessful. This is due to the matrix placement directly within the treatment chamber. The matrices are forced into hard to access areas of the apparatus.

The prior art entrains dust particles and deposits them into the emission control system, restricting air flows and causing excessive maintenance requirements.

Prior art only allows for the treatment of hydrocarbons.

Prior art is only applicable to removal of hydrocarbons through thermal processes. The review of the prior art indicates that the art is limited to the removal of hydrocarbons from soils and is not suitable, with regards to economical, ecological and safety matters, for the treatment of various volatile organic and inorganic chemicals and high boiling point chemicals. Therefore, a need exists for an economical and environmentally friendly method that separates volatile organic and inorganic contaminants from non-liquid matrices and collects these contaminants for recycling or reuse. A need also exists for a system which allows for the reuse of the decontaminated non-liquid matrices. This method provides a social benefit by providing an ecologically sound solution for the minimization of waste streams in an economical manner.

SUMMARY OF INVENTION

The present invention provides an apparatus for the separation of waste constituents from matrices, comprising: a vessel having a bottom and a top; where the top has a manifold for removal of gases; and a means for heating interior of said vessel, preferably located in the bottom of said apparatus. Preferably, the apparatus further comprises a removable tray, preferably between 1 and 4 trays. The apparatus may be permanently mounted or, is preferably mobile. In a preferred embodiment, the apparatus further comprises a means for generating a vacuum for withdrawing gases through the manifold, preferably ranging from 0" mercury to about 29" mercury.

In a preferred embodiment, the vessel is rectangular in shape and comprises from one to four sides, with the sides of the tray or trays effectively forming the sides of the vessel upon insertion into the bottom or base of the vessel. According to a preferred embodiment, the vessel lacks any sides. The tray preferably comprises a bottom having orifices, such that the bottom of the tray is capable of supporting matrices and yet allows air to pass upwardly through orifices and matrices. The bottom may be, for example, a screen or may be slotted. The apparatus can vary in its dimensions, depending upon such factors as the amount of matrices to be treated, the location of the treatment site, or whether the unit is designed to be fixed at a site or mobile, in one embodiment, the tray is of size, dimension and capacity so that it can be moved and loaded into vessel with a fork truck. Typically, for larger scale operations, the tray is designed to be loaded with matrices from the top and has a loading capacity of at least about 2.5 cubic yards. The tray may also comprise a hinged gate at an opposite end of the fork lift pockets for unloading treated matrix. In another embodiment, the apparatus is adapted for small scale usage, where the tray has a capacity of, for example, about 1 cubic foot.

According to one embodiment, the apparatus further comprises a means for mechanically agitating the matrices. The apparatus may further comprise a means for the introduction of chemical treatment additives.

In a further embodiment, the bottom surface of the top or the manifold comprises a high temperature silicon or other heat resistant gasket to seal the tray to the top or manifold so that air is directed through trays and matrices contained in the tray, and not around the tray. According to one embodiment, the top can be moved vertically. In another embodiment, the manifold optionally contains a 1 to 100 micron dry filter media which physically separates the matrix particles entrained in the purge gas air stream.

The apparatus may also further comprise a means for remotely monitoring operation of said apparatus using a controller system and transducers to convey information to a computer. The present invention further provides a method for the separation of hazardous and non-hazardous organic and inorganic waste constituents from matrices comprising: placing matrices in a container; heating matrices; creating a subatmospheric pressure within the matrices by establishing a vacuum above the matrices; and removing the gaseous constituents from the matrices. The matrices are selected from radioactive materials, industrial process waste streams, soils, sludges, activated carbon, catalysts, aggregates, biomass, debris, sorbents, drilling mud, drill cuttings and the like. The boiling points of the constituents can range, for example, from about 30 degrees Fahrenheit to about 1600 degrees Fahrenheit. Examples of constituents which may be removed include ammonia, mercury, mercuric compounds, cyanide, cyanide compounds, arsenic, arsenic compounds, selenium, selenium compounds, and other metals and their salts.

According to one embodiment, the constituents are not thermally destroyed or combusted during separation of constituents from the matrices. The method may comprise reversibly phase changing the constituents separated from the matrix by condensation of or physical filtration or adsorption of constituents. In one embodiment, the constituents are retained in the matrices for less than 0.5 seconds after desorption temperature of constituents has been achieved.

The method may comprise heating the matrices in an indirect manner by exposure to light energy with an emission spectrum between 0.2 and 14 microns. In one embodiment, the surface of matrices exposed to infrared energy becomes a secondary emitter and purge air convectively transfers heat to the matrix surface of the loaded tray. In another embodiment, the surface of the matrices exposed to light energy becomes an emitter and transfers heat conductively to matrix layers above the surfaces exposed to light energy. The method may further involve heating of the matrices by convective means whereby heat is conducted to the matrix layers above the bottom surface of the matrix.

In one particular embodiment, organic chemicals are separated from the matrices containing radionuclides and inorganic metallic constituents. The constituents may be recovered and refined for recycling purposes. The method may further comprise a means for purging gas vapors and constituents to be condensed and collected. In a further embodiment, the discharge air stream is recirculated below the trays to form a substantially closed loop system.

BRIEF DESCRIPTION OF THE DRAWINGS

FIG. 3 shows several views of a static or removable tray used in practicing the invention.

DETAILED DESCRIPTION OF THE INVENTION

Figure 1:
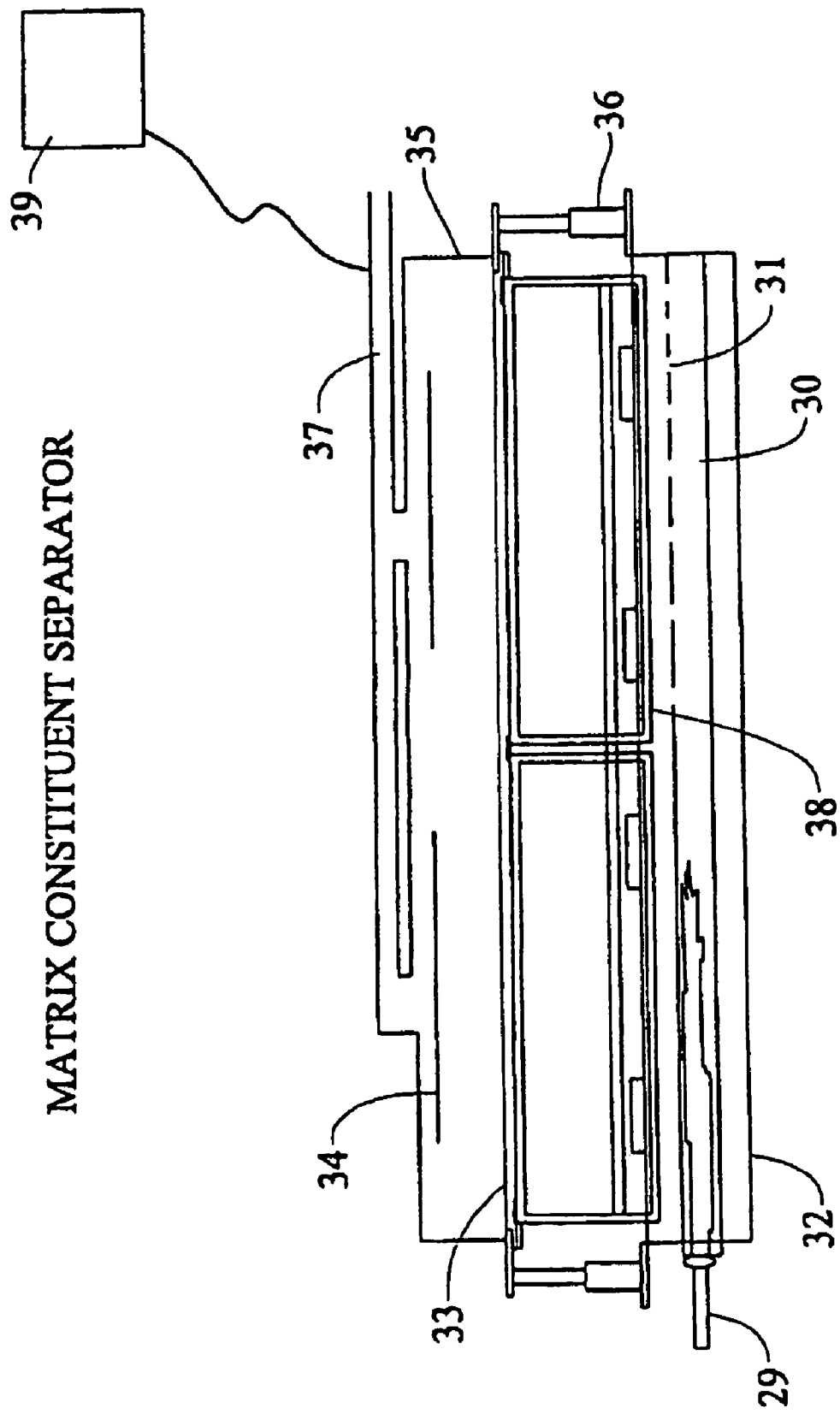
FIG. 1 is a side view of the apparatus of the invention.

The present invention relates to a method for the separation of hazardous and non-hazardous organic and inorganic constituents from various matrices. More particularly, the invention relates to a method for the separation of these various constituents from matrices by using one or more of the following principles: low temperature thermal desorption, radiant energy, convective heating, conductive heating, air stripping, vacuum distillation, reduced pressure volatilization and chemical volatilization through the addition of chemical additives and the like. More specifically, the invention relates to a method for the remediation of various matrices whereas a primary result of the process is to provide a waste minimization and resource recycling benefit. Preferably, the invention relates to a method for the remediation of the following waste stream areas: (1) separation of hazardous and non-hazardous organic and inorganic chemical constituents from radionuclide contaminated matrices without spreading or destabilizing the radionuclide contamine separation of raw materials and hazardous and non-hazardous organic and inorganic chemical constituents from an industrial process waste stream; and (2) the separation of hazardous and non-hazardous organic and inorganic chemical constituents from various matrices, including but not limited to, sludges, soils, activated carbon, catalysts, aggregates, biomass, debris and the like.

The Matrix Constituent Separator provides a controlled air flow distribution which the prior art lacked. The Matrix Constituent Separator enables an even distribution of air flow and heat drawn through the matrices contained in either the static or agitator tray to ensure complete desorption of the constituents contained within the entire matrix volume. For the desorption of volatile and semi-volatile organic and volatile inorganic chemicals, the lack of moving parts in the treatment chamber affords low maintenance and thus provides increased production and associated economical benefits.

This process enables the complete desorption, separation and collection, if desired, of all hazardous and non-hazardous organic and inorganic chemical constituents from a radioactive contaminated matrix without spreading or destabilizing the entrained radionuclides.

The Matrix Constituent Separator provides efficient, cost-effective separation for recovery of hazardous and non-hazardous organic and inorganic chemical constituents and matrices for recycling, reuse, economic disposal or further treatment of the hazardous constituents, due to the significant volume reduction in the quantity of waste requiring further handling.

The design of the present treatment apparatus maximizes the economic benefits and utilization of the fuels used in the system to generate radiant energy. The process is also efficient since it does not use any auxiliary fuels for the desorption of the chemicals from the matrices during the treatment process, or to condense and collect the vaporized constituents following desorption from the matrices.

The overall process achieves a significant and desirable volume and mass reduction in the waste stream which can then be recycled, reused at an economical benefit, disposed or further treated at significantly lower costs. The volume of chemical contaminants that are either emitted to the atmosphere or landfilled, are reduced substantially by the method of the invention because it affords a means for separating, remediating, collecting, purifying and recovering commercial products from contaminated matrices including the matrices themselves.

Prior art method involves heating material from the top and forces air downwardly through the material. This action contradicts the laws of physics and retards the treatment process. In the prior art, convective heat is not captured from the burners as air is drawn downwardly through the system. Most of the convective heat can be observed rising off and away from the top of the process. The MCS heats the soil from the bottom and the heater exhaust and heated air exit the system through the matrix. This process is efficient, and since heat rises naturally it does not require opposing forces to drive the air through the matrix. The upward air movement does not compress or compact the matrix allowing for free air flow through the matrix. The prior art caused matrix compaction which retards both the air flow through the system and the treatment effectiveness.

The MCS is preferably portable, as the cost for transporting the unit to the site to be treated is much less than the cost of moving the matrices to the treatment location and back to the place where the matrices were to be used as backfill materials or for other reuse or disposal.

The method preferably consists of charging the matrices into bottom screened trays which are mechanically placed into a heating frame having a reflective bottom and three vertical sides and open to the atmosphere at the top, establishing a vacuum, or at least a partial vacuum, through the top of the container to establish an up draft through the generally loosely packed matrices, heating the matrices from the bottom and pulling the hot gases upwardly behind or commingled with the gases, releasing the contaminants vapors from the matrices and removing them from the trays and manifold frame and collecting the contaminants vapors in an air emission control system if desired. Finally, the trays containing the treated matrices are removed from the heating frame and allowed to cool in a controlled manner while another set of trays are treated. Once the treated matrices contained within the trays have cooled, they are rehydrated within the trays in a controlled manner. The matrices are then removed from the trays so that fugitive emission or dust are minimized.

Air is pulled through the open base of the system to a point furthest away from the heat source. This air flow performs two functions: (1) drawing the convection heat through the source to heat the non-liquid matrices not exposed to the light energy; and (2) reducing the vapor pressure within the treatment chamber. Second, lowering of the pressure decreases the boiling point of the contaminants being liberated from the treated matrices. The vapor pressure/boiling point relationship is expressed by the following well known empirical equation for specific substances for which a and b values are known, wherein p=pressure in mm mercury; T=temperature in degrees Kelvin; a and b are constants given (among other places) in the CRC Handbook of Chemist and Physics, $69^{th}$ edition. (1988) beginning at page D-212.

$$\text{Log } 10p = 0.05223a \text{ divided by T plus b}$$

This allows the removal of contaminants with higher boiling points at lower temperatures. The energy needed to heat the system is only about one-fourth as much as required by other thermal treatment systems. The vacuum also works in a physical way as well. By physically drawing and saturating the treated matrices with air, the heated air will displace the other gases present and sweep them out of the treating trays which adds to the effectiveness of the system.

In the present invention various waste matrices are placed into trays and loaded onto the heater base, a fan draws air through the system acting on the matrices throughout the screened tray bottom. The heaters are activated, heating the matrices evenly and thoroughly to a depth between the range of less than an inch to over three feet. Typically, the matrices are heated to a depth in the range between 4 inches and 18 inches. The effective depth of heating can be readily determined by one skilled in the art and will be affected by such factors as heating source, physical characteristics of the matrix and the like. Ambient air entering the process at all locations below the matrices is also heated and pulled upward through the matrices carrying heat to the upper layer matrices. The combination of heat and reduced pressure removes the contaminants from the matrices and the air flow draws the removed contaminants out of the treatment process through an emission control or collection system. The matrices can be agitated and treatment can be non-thermal in nature if desired.

Figure 2:
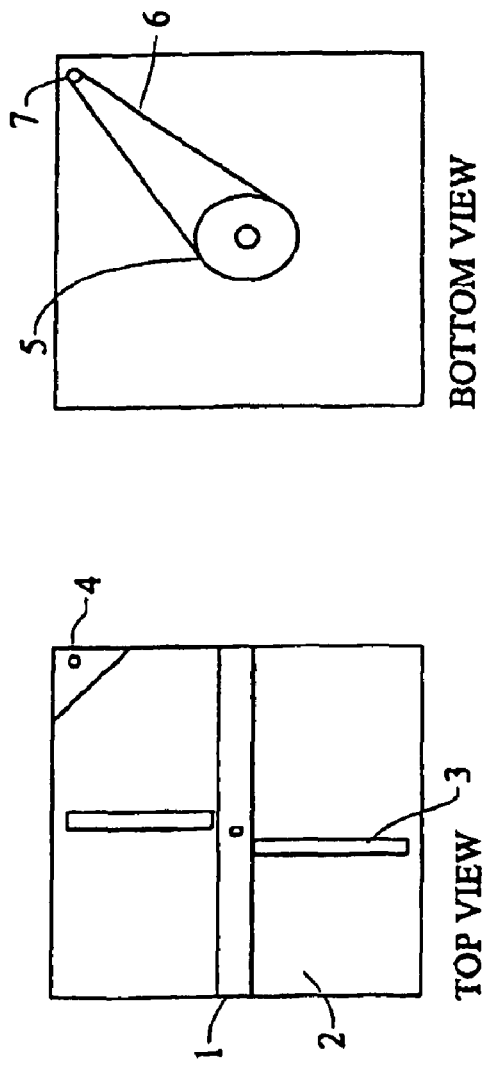
FIG. 2 shows top, bottom and side views of an agitator tray.
Figure 2:
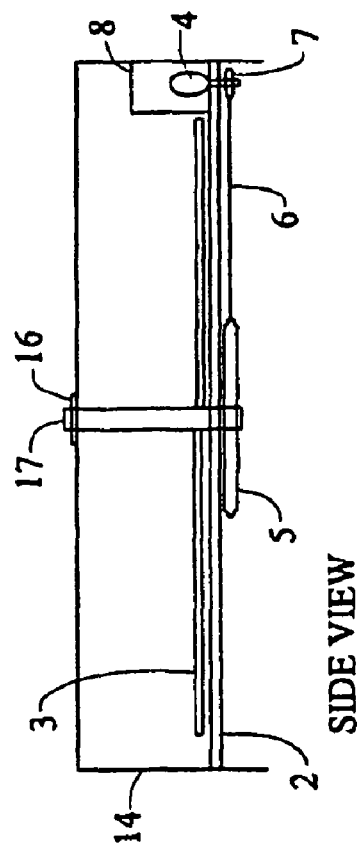

The system is a batch treatment process used to separate hazardous and non-hazardous organic and inorganic chemical constituents from various solid and semi-solid matrices. These matrices include but are not limited to radioactive contaminated matrices, industrial process waste streams, sludges, soils, activated carbon, catalysts, aggregates, biomass, debris and the like. The chemical constituents are separated from the matrices by heating the matrix in a tray while purging copious volumes of air or other gases through the matrix. The purge gas stream flows through a series of non-destructive emissions control components which remove the chemical constituents from the air stream by physical separation, condensation and absorption. In the preferred embodiment, the present invention comprises but is not limited to the following components:

Dry Particulate Filter
Condensing System
HEPA Filters
Carbon Absorption
Liquid Scrubbers
Reverse Osmosis
Chemical Precipitation
Physical Phase Separation
Coalescing Filters The apparatus of the present invention can be described by reference to the following figures:

FIG. 2:
1. Shaft support beam which houses the bearing and shaft that is connected to the matrix mixing flights.
2. Slotted screened bottom of tray which contains the contaminated matrices during processing.
3. Mixing flight which moves through matrix contained in tray to facilitate mixing of matrices during processing.
4. Hydraulic motor which drives mixing flights.
5. Slave sprocket which reduces power requirements and drives flights.
6. Drive chain which connects slave sprocket to drive sprocket.
7. Drive sprocket which is coupled to hydraulic motor for driving mixing flights.
8. Protective housing to keep hydraulic motor from hostile environments.
9. Hydraulic motor which drives mixing flights
10. Drive sprocket which is coupled to hydraulic motor for driving mixing flights.
11. Drive chain which connects slave sprocket to drive sprocket.
12. Slave sprocket which reduces power requirements and drives flights.
13. Slotted screened bottom of tray which contains the contaminated matrices during processing.
14. Agitator tray used to process matrices prior to, during and after introduction of chemical additives to enable treatment of certain inorganic contaminants.
15. Mixing flight which moves through matrix contained in tray to facilitate mixing of matrices during processing.
16. High temperature support bearing which allows slave shaft to rotate.
17. Central drive shaft in which flights are attached.

FIG. 3:
18. Slotted screened bottom of tray which contains the contaminated matrices during processing.
19. Hinge to dump gate for matrix removal following treatment.
20. Dump gate door which swings open to dump matrices.
21. Dump gate latch which prevents gate from opening during treatment.
22. pick-up pocket enables the forklift to move, load, unload and dump trays.
23. Dump gate latch which prevents gate from opening during treatment.
24. Hinge to dump gate for matrix removal following treatment.
25. Forklift pick-up pocket enables the forklift to move, load, unload and dump trays.
26. Slotted screened bottom of tray which contains the contaminated matrices during processing.
27. Bottom screen support to support weight of matrix loaded into trays.
28. Forklift pick-up pocket enables the forklift to move, load, unload and dump trays.
28a. Forklift pick-up pocket enables the forklift to move, load, unload and dump trays.

FIG. 1:
29. Process Burner
30. Radiant tube emitter
31. Combustion Exhaust Vents
32. Heater Base Assembly
33. High temperature silicone gasket material which seals exhaust manifold to tray top edge.
34. 1 to 100 micron filter media and support frame which acts as a physical barrier to stop particulates from exiting the system in the air stream.
35. Air extraction manifold
36. Hydraulic cylinder for lifting exhaust manifold.
37. Exhaust gas outlet.
38. Soil treatment tray.

The chemicals can be recovered for re-refining, further treatment, disposal or recycling from these various components without destroying the chemical constituents. The resulting discharge air stream is either free of or contains minimal concentrations of chemical constituents. This process can be used-to separate chemical constituents from radioactive contaminated solids without commingling the radionuclides with the chemical constituents.

In the preferred embodiment, the present invention comprises a base containing a multiplicity of heaters, preferably infrared heaters, which are positioned under the matrices and placed within a portable heater frame, with the heaters directed upwardly against the lower surfaces of the matrices. The apparatus also provides that the base of heaters can be mounted permanently to the manifold frame for most applications. An extraction blower or vacuum pump provides the impetus for upward movement of the contaminants through the matrix, which exits through the extraction blower or vacuum pump, or can be collected in an air emission control system if desired. Attached to the base by two hydraulic cylinders is the vacuum or exhaust manifold. The bottom surface of the manifold is gasketed with a temperature resistant gasket material. The manifold is raised hydraulically to allow for the loading and unloading of the screened bottom matrix trays onto the heater base. Once loaded, the upper manifold is lowered and sealed to the trays' top edge. This allows for the air to be drawn upwardly through the matrix and tray and not around it.

The preferred apparatus consists of five major components: manifold; process trays; heater base; purge air fan; and emission controls system. In the preferred embodiment, the trays are typically sized to approximately 8'×8'×17" and contain a slotted flat stainless steel screen. The waste matrix is loaded into the screened tray and the tray is placed on the heater base.

The heater base consists of typically 1 to 4 or more tray receptacles and has a rack of heaters mounted in it with enough space between the heater base and the manifold to insert the tray. The tray can be raised and lowered to aid in the tray loading and removal process. Once the tray is loaded and the manifold is lowered, the extraction fans force purge air through the matrix while the heaters illuminate the soils.

The surface of the matrix is heated and the purge gas stream moves through the matrix convectively transferring heat from the matrix surface layer which is exposed to the light energy and to the matrix materials located deeper in the tray. Conductive heat transfer occurs in the tray where matrix particles touch those particles exposed to the light energy as well as those particles which have been heated convectively. The purge air stream creates an equilibrium shift in which a vapor state is enhanced. Chemicals in the matrices exist as solids, liquids and vapors in an equilibrium state. Heat shifts the balance and generates more vapor. As this vapor is displaced and conveyed out of the system by the purge air vapor generation, it is further enhanced as the system tries to settle into an equilibrium state.

The Matrix Constituent Separator allows for the loading of trays at the stockpile area, and the trays, which fully contain both matrix and contaminants, can be transported in a controlled manner to the processing unit without spreading contaminants or releasing fugitive emissions. This new process also eliminates the need for workers to enter the process unit and clean out matrices, spent pea gravel filter media and the vacuum tubes. This significantly minimizes health and safety concerns with regard to exposure to contaminant vapors, heat stress, burns and back problems from working in an extremely hot environment with heavy materials.

The MCS process allows screened bottomed trays to be loaded onto a frame eliminating the screen plugging, entrained door filter media problems and the associated maintenance downtime. The MCS process consists of virtually no downtime for this reason. Should some maintenance be required to the screen on a particular tray, this can be accomplished while other trays are undergoing treatment. With the previous art, maintenance on the processor results in loss of production. The surface area of the static bed in the MCS processor is placed entirely on a screen resulting in 100% coverage.

The MCS process eliminates the loading door and promotes even air flows through the matrix and uniform treatment. The need for expensive filter media has been eliminated, lowering process cost and minimizing residual waste for disposal. In the MCS, all of these problems have been eliminated because the matrices are not in contact with process equipment.

In the MCS process, a 5 to 100 micron physical barrier prevents the entraining and migration of contaminants and particulates into emission control components. This makes for easy and efficient decontamination.

The MCS process can be equipped with mechanical agitators so that matrices can be chemically treated by mixing and through the addition of chemical compounds used to volatilize or gasify contaminants which are withdrawn from the trays and collected in the emission control system.

The MCS process allows for the controlled rehydration of the treated waste to control dust and prepare the matrix for reuse. This is not practical in the prior art. Production is not affected as rehydration of the trays can occur while other trays are undergoing treatment. With the prior art, rehydration would have to occur in the treatment chamber so that additional production is not possible. Also rehydration in the chamber results in an accumulation of water in the chamber which will impact (increase) the treatment time of the next batch, effecting production.

The MCS process is configured so that it is practical to monitor matrix temperatures, air flows, pressures and process emission control components using transducers and thermocouples. This allows operators to control the treatment process accurately. Prior art lacks these controls and could not be practically used in the matrix containment vessel. The use of the process controls will also limit the number of workers required to operate the system, thereby limiting potential exposure to health and safety risks. Both of these advantages will make the system more cost competitive.

The MCS process is a more economical and efficient means of treatment than the prior art.

The method of loading and unloading the prior art processor requires significant downtime between batches, which directly affects the production efficiency and economical benefit of this art. The process design of the MCS method realizes substantial production efficiencies and economical benefits over the prior art, resulting in part from the improvement in downtime between batches due to loading and unloading the treatment chamber with matrices.

In the present system all of the constituents will be converted to vapor and pneumatically conveyed by the air stream into an emission control system. Because purge air volumes are excessive, a means to physically separate particulates which have been entrained into the purge gas stream can be used. A dry particulate filter with pore spaces typically ranging from 1 to 100 microns is incorporated into the manifold just above the tray gaskets. This physical barrier stops these particles and separates them from the constituent vapors. The vapors travel through a condenser where they are condensed to a liquid. From this stage in the process, the vapors and purge gas air pass through a HEPA filter typically designed to screen out particles to 0.1 microns. The purge air travels through carbon to further purify it. The air is finally discharged to the atmosphere or reintroduced into the process as purge air. Scrubbers, staged condensation and the like can also be used to achieve the purge gas vapor removal.

The matrices in the trays can be mechanically agitated and chemical additives introduced to the matrix to enhance the process or convert constituents into a more volatile form for separation. This is achieved using a flighted paddle which turns inside the tray mixing the matrices. It can also be accomplished utilizing a drag bar.

Typically, the extraction fan is the only moving mechanical part which drives the system. The system can also be modified in a particular embodiment where agitator trays are utilized for treatment of certain chemical constituents. These tray bottoms can be capped to achieve vacuums ranging from about 0" to about 29" of mercury. This can further enhance the equilibrium shift. The results are that chemical constituents are separated from the matrices and collected in the emission control system without destroying them.

Inorganic and certain organic constituents can be separated by the system coupled with the use of a tray agitator and/or chemical addition. Some of these processes can be accomplished non-thermally. For example, a matrix contaminated with cyanide salts or organically bound cyanides can be placed inside a static tray, if the matrix is homogeneous in composition and permeability, or in an agitator tray if it is not. The addition of sulfuric, nitric, hydrochloric or other acids will produce hydrogen cyanide gas which is withdrawn from the matrix and passed through a caustic scrubber to create sodium cyanide which then can be collected and recycled. The matrix can then be neutralized with caustic and made suitable for possible reuse.

Mercury, arsenic, selenium and other transition elements can be liberated from a matrix by first acidifying the matrix then oxidizing it to get metals in their ground state. Addition of stannous chloride or sulfate will cause the hydride gas of the compound to form, releasing the compounds of concern which are collected and passed through an acid scrubber. Ammonium can be removed from a matrix by raising the pH with caustic and collecting the vapors in boric acid.

The mechanical agitator consists of a hydraulically powered process which may be chain driven beneath the bottom of the tray. The tray surface contains two flights that ride across the bottom of the screen. The flight rises in the center about 2 inches which plows through the matrix lifting the material and mixing it. The flights are attached to a shaft which protrudes below the tray screen. Below the bottom of the screen the shaft has a sprocket connected to it. This shaft is typically located in the center of the tray. The hydraulic motor shaft also extends through the screened bottom of the tray. There is a sprocket attached to this shaft as well. A C drive chain connects the two sprockets. When the motor shaft turns, the slave shaft turns pushing the flights through the matrix.

The heater base typically contains 8 to 12 radiant heaters that face upward toward the matrix.

The prior art has a series of recessed chambers in which tubular screens are inserted and attached to a manifold at one end. The soil to be treated rests on the bottom of the chamber and on top of the screens. The recessed area and the screens become plugged quickly. This caused uneven heating of soils which resulted in poor and uneven treatment. The soil which plugs the screens has to be manually removed, causing process downtime and health and safety concerns for the workers.

The present process does not employ a series of recessed chambers with screens within in which the matrix rest during treatment. The process chamber is separate from the treatment trays. The chamber is equipped with a frame in which a tray containing the matrix is placed. The tray has a self cleaning screened bottom which clears itself of any plugging that may occur in the dumping process.

The boiling point of a liquid is the temperature at which the partial pressure of the substance is equal to its vapor pressure. There is a direct relationship between the final treatment temperature and the system operating pressure. As the system is operating, pressure is reduced and the treatment temperature required for removal of compounds by volatilization is decreased. The MCS uses this principle of boiling point reduction by reducing the system pressure. The system pressure is reduced from about 0" mercury to approximately 1" to 30" mercury. FIG. 1 shows examples of this relationship for water, acetone, TCE and PCE.

| Approximate Boiling Points of Compounds at Reduced Pressure | | |
|---|---|---|
| Compound | Boiling pt. at 0" Hg (° F.) | Boiling pt. at 25" Hg (° F.) |
| Water | 212 | 72 |
| Acetone | 133 | 44 |
| Trichloroethylene | 189 | 65 |
| Tetrachloroethylene | 250 | 86 |

Vacuum is expressed in terms of total vacuum in inches of mercury

Referring to FIG. 1, it is readily seen that the relationship between the boiling point and the system pressure, although direct, is not linear. This non-linearity is described by the Clausius-Clapyron equation:

$$p = p^* x \exp - C \text{ with } C = \frac{(\text{delta } H_{VAP}) \times (1 - 1)}{R \quad\quad TT^*} \quad \text{Equation 1}$$

where:
  $p^*$ is the vapor pressure (atm.) at the temperature $T^*$ (*R);
  $p$ is the vapor pressure (atm.) at temperature T (*a);
  R is the universal gas constant (BTU/mol–*R); and
  delta $H_{VAP}$ is the heat of vaporization (BTU/lb)

Three assumptions are made for the above equation to hold true: 1) the change in the molar volume equals the molar volume of gas; 2) the gas behaves as an ideal gas; and 3) the enthalpy of vaporization (delta $H_{VAP}$) is independent of temperature. Table 1 compares the boiling point from tabular data to the boiling point calculated with the Clausius-Clapyron equation for several chemicals at a pressure of approximately 25" mercury.

Another important parameter related to air flow is air stripping. Air stripping is the process of using the carrier gas, air, to remove the contaminants from the non-liquid materials. The rate at which a contaminant is stripped from the soil depends on its vapor pressure and stability in water. This process can be described by Henry's Law which is represented by the following equation:

$$P_a = X_a \times k(T) \quad\quad \text{Equation 2}$$

where
  $P_a$ is the partial pressure of component a
  k is Henry's Law constant for component a at temperature T
  $X_a$ is the mole fraction of a in solution (X a is small)

Therefore, desorption of each contaminant is taking place throughout the entire process, not only when the boiling point of each of the compounds is reached.

Chemical volatilization consists of a two step chemical reaction which is shown below.

$$C(l) \text{ at } T_o \quad \xrightarrow{\text{Heat}} \quad C(l) \text{ at } T_{bp} \quad\quad \text{Equation 3}$$
$$\text{Delta } H_t$$

$$C(l) \text{ at } T_{bp} \xrightarrow[\text{Delta } H_v]{\text{Heat}} C(g) \text{ at } T_{bp} \qquad \text{Equation 4}$$

where:

C is the specific (and pure) chemical with a defined boiling point (Tbp)

C (l) is the above chemical in the liquid phase and at some temperature, T

C (g) is the above chemical in the gaseous phase and at some temperature, T $T_o$ is ambient temperature $T_{bp}$ is the boiling point temperature In the first reaction, the temperature of the contaminant (or chemical) is increased until the boiling point is reached. The amount of energy required to raise the temperature from the initial temperature to the boiling point depends on the heat capacity (for the liquid phase) and the quantity of the contaminant. For example, water in the liquid phase requires 1 BTU of energy to raise the temperature of 1 lb 1 degrees Fahrenheit. The second reaction shows that after the contaminant reaches its boiling point, the temperature remains constant while the liquid vaporizes. The heat of vaporization is the amount of energy required to produce a phase change from the liquid phase to the gaseous phase. For water, the heat of vaporization is 950 BTU/lb (at 212 degrees Fahrenheit). The total heat required is the sum of the enthalpies of the individual reactions or delta H, plus delta H.

There are three primary components in the matrix: 1) the contaminants; 2) water; and 3) the matrix itself. The contaminants and the water undergo the two-step chemical reaction of volatilization while the matrix is only heated. The contaminants are present in concentrations of parts per million (ppm), the water in concentrations ranging from 10-20% and the remaining 80-90% is the matrix.

The two main drivers for the required energy input are the water and the matrix since the contaminants are present in relatively low concentrations. As explained above, energy is used to heat the water to its boiling point and is continually added to vaporize the water and heat the system to the final target treatment temperature. Thus, in determining the total amount of energy required to reach a target treatment temperature, the relative amounts of matrix and water (and their corresponding heat capacities) must be taken into consideration as well as the final target treatment temperature which is dependent on the highest boiling point contaminants.

The invention claimed is:

1. A method for the separation of hazardous and non-hazardous organic and inorganic waste constituents from matrices comprising:
    placing matrices in a vessel, said vessel comprising a frame adapted to receive one or more removable trays;
    heating matrices with a heater, said heater being positioned in a manner to allow heat to enter said vessel at a position below said one or more removable trays when inserted in said frame;
    creating a subatmospheric pressure within the matrices by establishing a vacuum above the matrices; and
    removing the gaseous constituents from the matrices through a manifold positioned on top of said vessel;
    wherein said one or more removable trays are adapted to be inserted in said frame, said one or more removable trays comprising a bottom part and peripheral sidewalls extending therefrom, said bottom part being capable of supporting the matrices and being structured so as to define orifices in the bottom; and
    wherein, upon insertion of said one or more removable trays in said vessel, said peripheral sidewalls of said one or more removable trays effectively form the sides of said vessel.

2. The method of claim 1 herein said matrices are selected from radioactive materials, industrial process waste streams, soils, sludges, activated carbon, catalyst, aggregates, biomass, debris, sorbents, drilling mud and drill cuttings.

3. The method of claim 1 wherein boiling points of said constituents range from about 30 degrees Fahrenheit to about 1600 degrees Fahrenheit.

4. The method of claim 1 wherein said constituents are selected from ammonia, mercury, mercuric compounds, cyanide, cyanide compounds, arsenic, arsenic compounds, selenium, selenium compounds, and other metals and their salts.

5. The method of claim 1 further comprising the separation of constituents from matrices in which constituents are not thermally destroyed or combusted.

6. The method of claim 1 further comprising reversibly phase changing constituents separated from matrix by condensation of or physical filtration or adsorption of constituents.

7. The method of claim 1 wherein constituents are retained in matrices for less than 0.5 seconds after desorption temperature of constituents has been achieved.

8. The method of claim 1 further comprising heating matrices in an indirect manner by exposure to light energy with an emission spectrum between 0.2 to 14 microns.

9. The method of claim 1 wherein the surface of matrices exposed to infrared energy becomes secondary emitter and purge air convectively transfers heat to matrix surface of loaded tray.

10. The method of claim 1 wherein surface of matrices exposed to light energy becomes emitter and transfers heat conductively to matrix layers above surfaces exposed to light energy.

11. The method of claim 1 wherein matrices heated by convective means conducts heat to matrix layers above surface of matrix.

12. The method of claim 1 further comprising separating organic chemicals from matrices containing radionuclides and inorganic metallic constituents.

13. The method of claim 1 wherein said vacuum ranges from 0 inches mercury to about 29 inches mercury.

14. The method of claim 1 further comprising means for recovery of constituents which can be refined for recycling purposes.

15. The method of claim 1 further comprising means for purging gas vapors and constituents to be condensed and collected.

16. The method of claim 1 wherein discharge air stream is recirculated below trays to form a substantially closed loop system.

17. The method of claim 1 wherein said bottom part is a screen.

18. The method of claim 1 wherein said bottom part is slotted.

19. The method of claim 1 wherein said one or more removable trays has fork lift pockets.

20. The method of claim 1 wherein said one or more removable trays has a loading capacity of at least about 2.5 cubic yards.

21. The method of claim 1 wherein said vessel further comprises a device for mechanically agitating matrices, said means for mechanically agitating being positioned in said interior and connected to said vessel.

22. The method of claim 1 wherein said manifold comprises a heat resistant gasket touching said vessel.

23. The method of claim 1 wherein said manifold contains a 1 to 100 micron dry filter.

24. The method of claim 1 wherein said vessel comprises between 1 and 4 of said removable trays.

25. The method of claim 1 wherein said vessel is permanently mounted.

26. The method of claim 1 wherein said manifold is not attached to said vessel.

27. The method of claim 1 wherein said vessel is mobile.

28. The method of claim 1 wherein said vessel comprises a hydraulic system, said hydraulic system being positioned under said manifold and being capable of lifting said manifold from said vessel.

* * * * *